(12) United States Patent
Huang

(10) Patent No.: US 9,804,399 B2
(45) Date of Patent: Oct. 31, 2017

(54) DISPLAY SYSTEM AND HEAD MOUNTED DISPLAY USING THE SAME

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 69 days.

(21) Appl. No.: 14/980,282

(22) Filed: Dec. 28, 2015

(65) Prior Publication Data

US 2017/0184860 A1 Jun. 29, 2017

(30) Foreign Application Priority Data

Sep. 15, 2015 (TW) ............................. 104130377 A

(51) Int. Cl.
| | |
|---|---|
| G02B 27/01 | (2006.01) |
| G02B 17/00 | (2006.01) |
| G03B 21/00 | (2006.01) |
| G03B 21/20 | (2006.01) |

(52) U.S. Cl.
CPC ....... *G02B 27/0176* (2013.01); *G02B 17/006* (2013.01); *G02B 27/0172* (2013.01); *G03B 21/008* (2013.01); *G03B 21/208* (2013.01); *G03B 21/2033* (2013.01); *G03B 21/2066* (2013.01); *G02B 2027/015* (2013.01); *G02B 2027/0178* (2013.01)

(58) Field of Classification Search
CPC .............. G02B 27/0176; G02B 17/006; G02B 27/0172; G03B 21/008; G03B 21/2033; G03B 21/2066; G03B 21/208
USPC .......................... 345/8; 359/33, 34, 850, 385
See application file for complete search history.

(56) References Cited

U.S. PATENT DOCUMENTS

| | | | |
|---|---|---|---|
| 6,840,634 B1 * | 1/2005 | Chang ................. | H04N 5/7458 348/771 |
| 2014/0160576 A1 * | 6/2014 | Robbins ............. | G02B 27/0172 359/630 |

FOREIGN PATENT DOCUMENTS

| | | |
|---|---|---|
| CN | 102445755 | 5/2012 |
| TW | I319837 | 1/2010 |
| TW | M426771 | 4/2012 |

* cited by examiner

*Primary Examiner* — Towfiq Elahi
(74) *Attorney, Agent, or Firm* — Kirton McConkie; Evan R. Witt

(57) ABSTRACT

A display system includes an optical integrated rod, a solid-state light-emitting device disposed on an entrance of the optical integrated rod, a first TIR prism, a reflection mirror, a second TIR prism, a digital micromirror device and an eyepiece. The first TIR prism has a first surface disposed adjacent to an exit of the optical integrated rod, a second surface and a third surface. The second TIR prism has a fourth surface in contact with the third surface by an air gap, a fifth surface and a sixth surface. The reflection mirror is disposed on the second surface. The digital micromirror device is disposed adjacent to the fifth surface. The eyepiece is disposed adjacent to the sixth surface. Light is input to the digital micromirror device along an illumination optical path, and projected on a pupil surface along an imaging optical path. The volume of the display system is reduced.

14 Claims, 4 Drawing Sheets

DISPLAY SYSTEM AND HEAD MOUNTED DISPLAY USING THE SAME

TECHNICAL FIELD

The present disclosure relates to a display system, and more particularly to a display system and a head mounted display using the same.

DESCRIPTION OF THE RELATED ART

In recent years, head mounted displays and near-eye displays become the major direction of developing technology products. The head mounted displays and near-eye displays are developed for bringing a more convenient life to users, and are further applied to the Internet of Things.

In general, a conventional head mounted display has an exterior similar with an eyeglass. Please refer to FIG. 1. FIG. 1 schematically illustrates the structural view of a conventional head mounted display of prior art. As shown in FIG. 1, an optical device 11 of a conventional head mounted display 1 is usually disposed on an eyeglass frame 12, and light or an image is projected to eyes E of a user through the design of the optical path, so that the user can see the image. However, the conventional head mounted display 1 seems to be cumbersome due to the limitation of the thicknesses of the optical device 11 and the eyeglass frame 12, thereby bringing bad user experiences and causing that the user does not want to use.

In order to improve the user experience mentioned above, another type of conventional head mounted displays is developed. Please refer to FIG. 2. FIG. 2 schematically illustrates the structural view of another conventional head mounted display of prior art. As shown in FIG. 2, in this type of conventional head mounted displays, an optical device of a conventional head mounted display 2 is partially disposed on an eyeglass frame 20. Compared with the above-mentioned conventional head mounted display 1, the thickness of an eyeglass body 21 may be slightly reduced. Nevertheless, a display device, an eyepiece and a reflection mirror still have to be disposed inside the eyeglass body 21, so that the eyeglass body 21 practically has to have a certain thickness that cannot have the similar exterior with an eyeglass.

Meanwhile, organic light-emitting diode (OLED) panels are generally utilized by the head mounted displays mentioned above. Since an OLED panel has a large volume and the illumination of the pixels of the OLED panel belongs to a self-luminous and omnidirectional illumination, not only the volume of a head mounted display cannot be effectively reduced, but also a lot of light waste due to the characteristic of the omnidirectional illumination. The power consumption is significantly increased.

There is a need of providing a display system and a head mounted display using the same to obviate the drawbacks encountered from the prior art.

SUMMARY OF THE DISCLOSURE

Some embodiments of the present disclosure are to provide a display system and a head mounted display using the same in order to overcome at least one of the above-mentioned drawbacks encountered by the prior arts.

The present disclosure provides a display system and a head mounted display using the same. By disposing a first TIR prism and a second TIR prism and contacting a third surface of the first TIR prism with a fourth surface of the second TIR prism by an air gap, the first TIR prism and the second TIR prism may be jointly utilized by the illumination optical path and the imaging optical path, thereby effectively reducing the volume of the display system.

The present disclosure also provides a display system and a head mounted display using the same. Since a plurality of light-emitting diodes are selected and used as solid-state light-emitting device and relay lenses are utilized for converting the exit angle of the light-emitting diodes into the incident angle of the miniature panel, the light emitted by the light-emitting diodes is completely utilized, and the illumination efficiency and the utilization of the light are significantly enhanced.

The present disclosure also provides a display system and a head mounted display using the same. By utilizing a waveguide component, the degrees of the incident angles of imaging light are effectively kept. In addition, the volume of the head mounted display is effectively reduced because of the thin-plate-exterior of the waveguide component.

In accordance with an aspect of the present disclosure, there is provided a display system. The display system includes an optical integrated rod, a solid-state light-emitting device, a first total internal reflection (hereinafter "TIR") prism, a reflection mirror, a second TIR prism, a digital micromirror device and an eyepiece. The solid-state light-emitting device is disposed on an entrance of the optical integrated rod for emitting light to the optical integrated rod. The first TIR prism has a first surface, a second surface and a third surface. The first surface is disposed adjacent to an exit of the optical integrated rod. The reflection mirror is disposed on the second surface. The second TIR prism has a fourth surface, a fifth surface and a sixth surface. The fourth surface is in contact with the third surface by an air gap. The digital micromirror device is disposed adjacent to the fifth surface. The eyepiece is disposed adjacent to the sixth surface. The light is sequentially transmitted through the optical integrated rod, input from the first surface to the first total internal reflection prism, reflected by the third surface and the reflection mirror, and transmitted through the third surface, the fourth surface and the fifth surface so as to be input to the digital micromirror device along an illumination optical path, and then is sequentially reflected by the digital micromirror device, input from the fifth surface to the second total internal reflection prism, reflected by the fourth surface, and transmitted through the sixth surface and the eyepiece so as to be projected on a pupil surface along an imaging optical path.

In accordance with another aspect of the present disclosure, there is provided a head mounted display. The head mounted display includes a frame, a display system and a waveguide component. The display system includes an optical integrated rod, a solid-state light-emitting device, a first TIR prism, a reflection mirror, a second TIR prism, a digital micromirror device and an eyepiece. The solid-state light-emitting device is disposed on an entrance of the optical integrated rod for emitting light to the optical integrated rod. The first TIR prism has a first surface, a second surface and a third surface. The first surface is disposed adjacent to an exit of the optical integrated rod. The reflection mirror is disposed on the second surface. The second TIR prism has a fourth surface, a fifth surface and a sixth surface. The fourth surface is in contact with the third surface by an air gap. The digital micromirror device is disposed adjacent to the fifth surface. The eyepiece is disposed adjacent to the sixth surface. The light is sequentially transmitted through the optical integrated rod, input from the first surface to the first total internal reflection prism, reflected by the third surface and the reflection mirror, and transmitted through the third surface, the fourth surface and the fifth surface so as to be input to the digital micromirror device along an illumination optical path, and then is sequentially reflected by the digital micromirror device, input from the fifth surface to the second total internal reflection prism, reflected by the fourth surface, and transmitted through the sixth surface and the eyepiece so as to be projected on a pupil surface along an imaging optical path. The waveguide component is overlapped with the pupil surface for guiding the light. The differences between incident angles of imaging light are between ±15°. The frame, the solid-state light-emitting device, the optical integrated rod, the first total internal reflection prism, the digital micromirror device, the second total internal reflection prism, the eyepiece and the waveguide component are sequentially disposed on a straight line.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
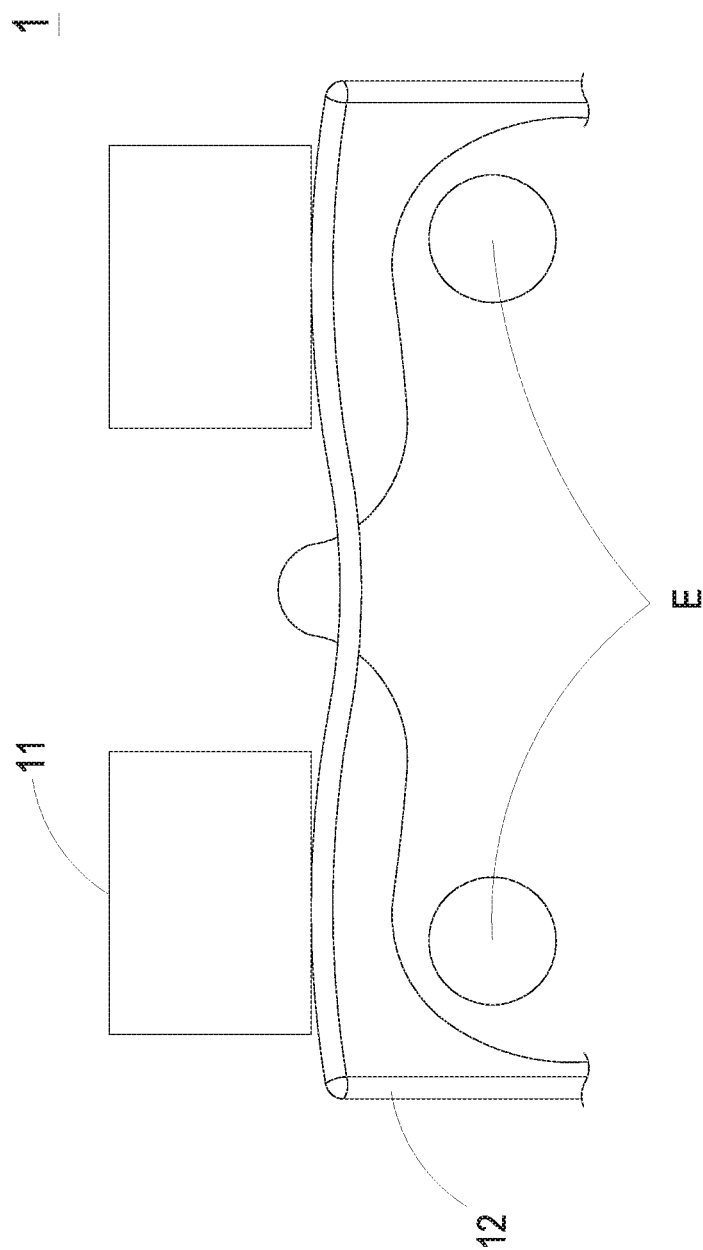
FIG. 1 schematically illustrates the structural view of a conventional head mounted display of prior art.
Figure 2:
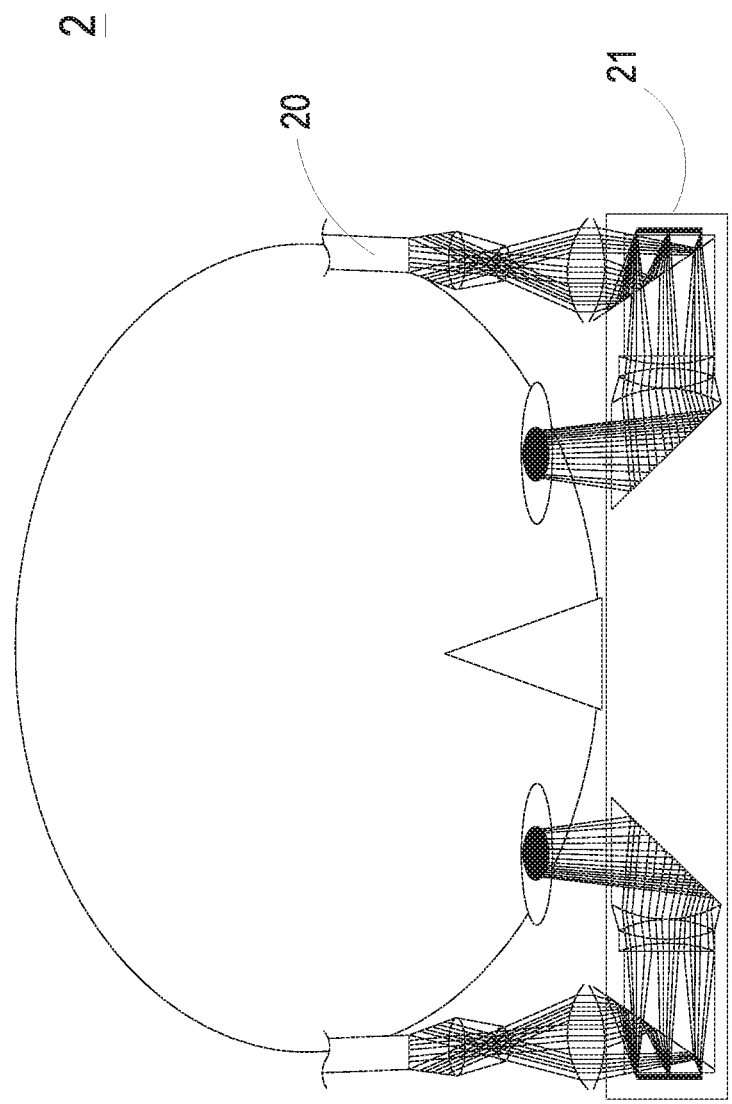
FIG. 2 schematically illustrates the structural view of another conventional head mounted display of prior art.
Figure 3:
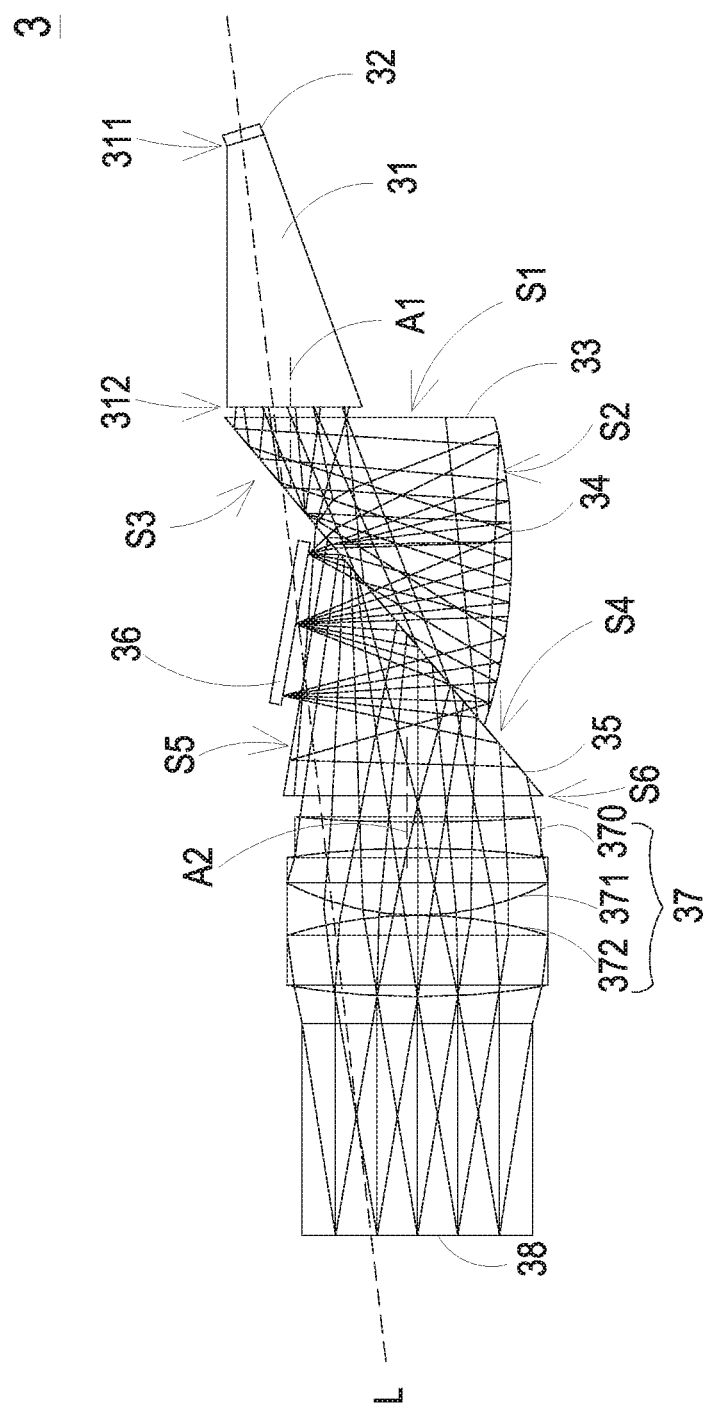
FIG. 3 schematically illustrates the structural view of a display system according to an embodiment of the present disclosure.

Please refer to FIG. 3. FIG. 3 schematically illustrates the structural view of a display system according to an embodiment of the present disclosure. As shown in FIG. 3, a display system 3 of the present disclosure includes an optical integrated rod 31, a solid-state light-emitting device 32, a first total internal reflection (hereinafter "TIR") prism 33, a reflection mirror 34, a second TIR prism 35, a digital micromirror device 36 and an eyepiece 37. The solid-state light-emitting device 32 is disposed on an entrance 311 of the optical integrated rod 31 for emitting light to the optical integrated rod 31. The first TIR prism 33 has a first surface 51, a second surface S2 and a third surface S3. The first surface 51 is disposed adjacent to an exit 312 of the optical integrated rod 31. The reflection mirror 34 is disposed on the second surface S2 of the first TIR prism 33, and is preferably formed on the second surface S2 (e.g. coated on the second surface S2), but not limited thereto. The second TIR prism 35 has a fourth surface S4, a fifth surface S5 and a sixth surface S6. An air gap is between the fourth surface S4 and the third surface S3. The digital micromirror device 36 is disposed adjacent to the fifth surface S5. The eyepiece 37 is disposed adjacent to the sixth surface S6.

The light of red, green or blue color emitted by the solid-state light-emitting device 32 is sequentially transmitted through the optical integrated rod 31, input from the first surface S1 into the first TIR prism 33, reflected by the third surface S3 and the reflection mirror 34, and transmitted through the third surface S3, the fourth surface S4 and the fifth surface S5, so as to be input to the digital micromirror device 36 along an illumination optical path, and then is sequentially reflected by the digital micromirror device 36, be input from the fifth surface S5 into the second TIR prism 35, be reflected by the fourth surface S4, and be transmitted through the sixth surface S6 and the eyepiece 37, so as to be projected on a pupil surface 38 along an imaging optical path. In particular, the exit 312 of the optical integrated rod 31 is imaged to the pupil surface 38 and the digital micromirror device 36 is imaged to a surface in the infinity. In other words, by disposing a first TIR prism 33 and a second TIR prism 35 and contacting a third surface S3 of the first TIR prism 33 with a fourth surface S4 of the second TIR prism 35 by an air gap, the first TIR prism 33 and the second TIR prism 35 may be jointly utilized by the illumination optical path and the imaging optical path, thereby effectively reducing the volume of the display system 3.

In this embodiment, the first TIR prism 33 is preferred to be a triangular prism, and the first surface S1, the second surface S2 and the third surface S3 are preferred to be sequentially disposed along a clockwise direction, but not limited thereto. The second TIR prism 35 is preferred to be a triangular prism, and the fourth surface S4, the fifth surface S5 and the sixth surface S6 are preferred to be sequentially disposed along a counter-clockwise direction, but not limited thereto. In addition, the first TIR prism 33 and the second TIR prism 35 are jointly disposed between the optical integrated rod 31 and the eyepiece 37.

In some embodiments, the solid-state light-emitting device 32 is not limited to include at least a light-emitting diode. Moreover, the solid-state light-emitting device 32 is preferred to include a plurality of light-emitting diodes, but not limited thereto. The optical integrated rod 31 is a taper cylinder, and the solid-state light-emitting device 32 is connected with the optical integrated rod 31, so that the light emitted by the light-emitting diodes is completely guided into the optical integrated rod 31, in which the directivity of the light-emitting diodes is used. Since a plurality of light-emitting diodes are selected and used as solid-state light-emitting device 32, and relay lenses are utilized for converting the exit angle of the light-emitting diodes into the incident angle of the miniature panel, the light emitted by the light-emitting diodes is completely utilized in the illumination optical path and the imaging optical path, and the illumination efficiency and the utilization of the light are significantly enhanced.

In some embodiments, the light emitted by the solid-state light-emitting device 32 is input from the optical integrated rod 31 to the first TIR prism 33 along a first optical axis A1, and the light is input from the second TIR prism 35 to the eyepiece 37 along a second optical axis A2. An angle between the extension of the first optical axis A1 and the extension of the second optical axis A2 is less than or equal to 15°. Preferably, the first optical axis A1 is parallel to the second optical axis A2, but not limited thereto.

In some embodiments, the solid-state light-emitting device 32, the optical integrated rod 31, the first TIR prism 33, the digital micromirror device 36, the second TIR prism 35, the eyepiece 37 and the pupil surface 38 are sequentially disposed on a straight line L. It should be noted that the main components of the display system 3 of the present disclosure are not necessary to be disposed on the different lines for being corresponded to different optical paths with a large angle (e.g. >50°) directional conversion of prior art, so that the volume of the display system 3 is effectively reduced. Furthermore, in order to enhance the resolution of the image projected on the pupil surface 38, the eyepiece 37 preferably includes a concave lens 370, a first convex lens 371 and a second convex lens 372, and the concave lens 370, the first convex lens 371 and the second convex lens 372 are sequentially disposed along the imaging optical path. In brief, the concave lens 370, the first convex lens 371 and the second convex lens 372 are sequentially disposed on the straight line L.

Figure 4:
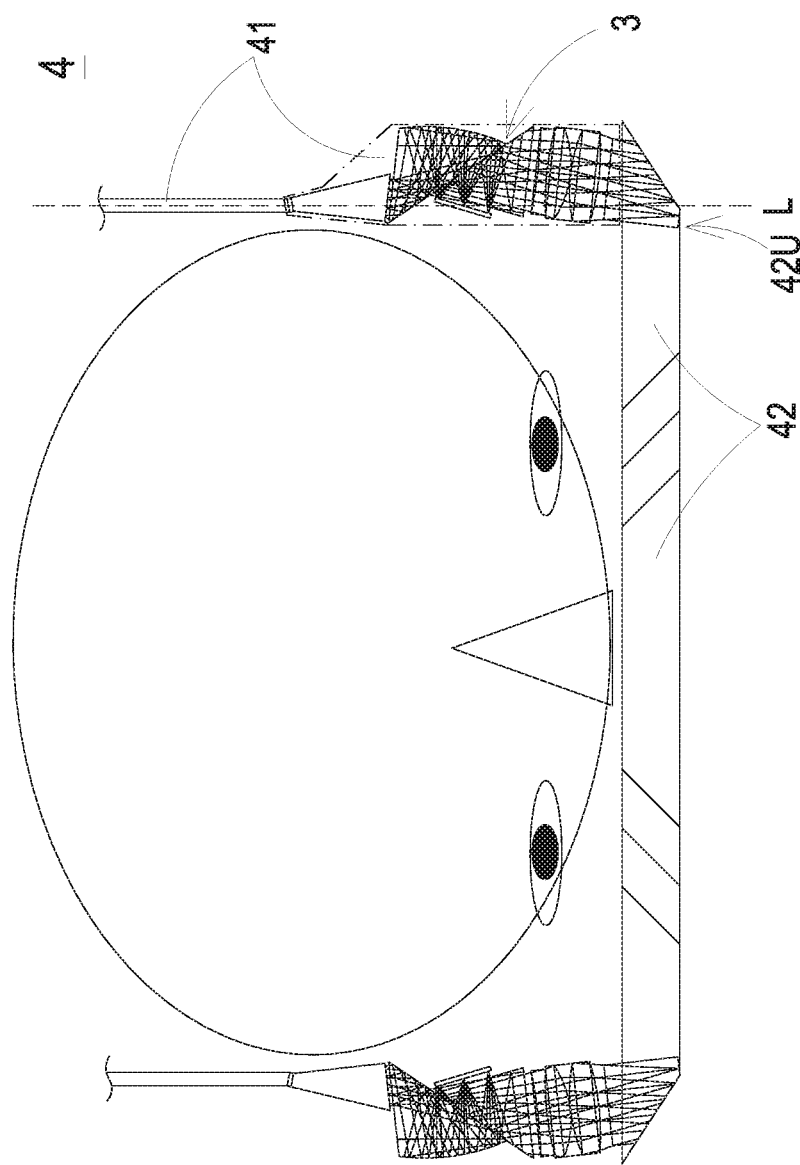
FIG. 4 schematically illustrates the structural view of a head mounted display according to an embodiment of the present disclosure.

Please refer to FIG. 3 and FIG. 4. FIG. 4 schematically illustrates the structural view of a head mounted display according to an embodiment of the present disclosure. As shown in FIG. 3 and FIG. 4, a display system 3 and a head mounted display 4 may include a waveguide component 42. The waveguide component 42 is a prism, and an upper bottom surface 42U and the extension of the upper bottom surface 42U are overlapped with the extension of the pupil surface 38, so that the differences between incident angles of imaging light are between ±15°, but not limited thereto. Meanwhile, the volume of the head mounted display 4 is effectively reduced because of the thin-plate-exterior of the waveguide prism.

In some embodiments, a head mounted display 4 of the present disclosure includes a frame 41, a display system 3 and a waveguide component 42. The display system 3 includes an optical integrated rod 31, a solid-state light-emitting device 32, a first TIR prism 33, a reflection mirror 34, a second TIR prism 35, a digital micromirror device 36 and an eyepiece 37. Since the optical integrated rod 31, the solid-state light-emitting device 32, the first TIR prism 33, the reflection mirror 34, the second TIR prism 35, the digital micromirror device 36 and the eyepiece 37 are described in the above-mentioned embodiments, they are not redundantly described herein. In the head mounted display 4 of the present disclosure, the waveguide component 42 is overlapped with the pupil surface 38 for guiding the light emitted by the solid-state light-emitting device 32. Particularly, an upper bottom surface 42U of the waveguide component 42 and the extension of the upper bottom surface 42U are overlapped with the extension of the pupil surface 38, so that the differences between incident angles of imaging light are between ±15°. Meanwhile, the frame 41, the solid-state light-emitting device 32, the optical integrated rod 31, the first TIR prism 33, the digital micromirror device 36, the second TIR prism 35, the eyepiece 37 and the waveguide component 42 are sequentially disposed on a straight line L. It should be noted that since the main components of the display system 3 of the present disclosure are all disposed on the same straight line, the volume of the display system 3 and the volume of the head mounted display 4 are effectively reduced. That is, the main components are no longer limited to be disposed on different lines for being corresponded to different optical paths with directional conversions of prior art.

Moreover, the display system 3 of the present disclosure is further integrally disposed inside the frame 41, in which the display 3 is completely covered by the frame 41 of the head mounted display 4, thereby forming an exterior of an eyeglass. In other words, when the head mounted display 4 of the present disclosure is manufactured to have an exterior of an eyeglass, only the waveguide component 42 is disposed as the lens portion. Therefore, the volume of the lens portion of the head mounted display 4 is similar with a lens portion of a conventional eyeglass, thereby significantly enhancing the user experiences.

From the above description, the present disclosure provides a display system and a head mounted display using the same. By disposing a first TIR prism and a second TIR prism and contacting a third surface of the first TIR prism with a fourth surface of the second TIR prism by an air gap, the first TIR prism and the second TIR prism may be jointly utilized by the illumination optical path and the imaging optical path, thereby effectively reducing the volume of the display system. Meanwhile, since a plurality of light-emitting diodes are selected and used as solid-state light-emitting device and relay lenses are utilized for converting the exit angle of the light-emitting diodes into the incident angle of the miniature panel, the light emitted by the light-emitting diodes is completely utilized, and the illumination efficiency and the utilization of the light are significantly enhanced. In particular, by utilizing a waveguide component, the degrees of the incident angles of imaging light are effectively kept. In addition, the volume of the head mounted display is effectively reduced because of the thin-plate-exterior of the waveguide component.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display system, comprising:
an optical integrated rod;
a solid-state light-emitting device disposed on an entrance of the optical integrated rod for emitting light to the optical integrated rod;
a first total internal reflection prism having a first surface, a second surface and a third surface, wherein the first surface is disposed adjacent to an exit of the optical integrated rod;
a reflection mirror disposed on the second surface;
a second total internal reflection prism having a fourth surface, a fifth surface and a sixth surface, wherein the fourth surface is in contact with the third surface by an air gap;
a digital micromirror device disposed adjacent to the fifth surface; and
an eyepiece disposed adjacent to the sixth surface,
wherein the light is sequentially transmitted through the optical integrated rod, input from the first surface into the first total internal reflection prism, reflected by the third surface and the reflection mirror, and transmitted through the third surface, the fourth surface and the fifth surface so as to be input to the digital micromirror device along an illumination optical path, and then is sequentially reflected by the digital micromirror device, input from the fifth surface into the second total internal reflection prism, reflected by the fourth surface, and transmitted through the sixth surface and the eyepiece so as to be projected on a pupil surface along an imaging optical path, and
wherein the solid-state light-emitting device, the optical integrated rod, the first total internal reflection prism, the digital micromirror device, the second total internal reflection prism, the eyepiece and the pupil surface are sequentially disposed on a straight line.

2. The display system according to claim 1, wherein the solid-state light-emitting device is connected with the optical integrated rod.

3. The display system according to claim 1, wherein the light is input from the optical integrated rod to the first total internal reflection prism along a first optical axis, and the light is input from the second total internal reflection prism to the eyepiece along a second optical axis.

4. The display system according to claim 3, wherein an angle between an extension of the first optical axis and an extension of the second optical axis is less than or equal to 15°.

5. The display system according to claim 3, wherein the first optical axis is parallel to the second optical axis.

6. The display system according to claim 1, wherein the first total internal reflection prism is a triangular prism, the second total internal reflection prism is a triangular prism, and the first total internal reflection prism and the second total internal reflection prism are jointly disposed between the optical integrated rod and the eyepiece.

7. The display system according to claim 1, wherein the exit of the optical integrated rod and the pupil surface are conjugate surfaces.

8. The display system according to claim 1 further comprising a waveguide component, wherein the waveguide component is a prism, and an upper bottom surface and an extension of the upper bottom surface are overlapped with an extension of the pupil surface, so that the differences between incident angles of imaging light are between ±15°.

9. The display system according to claim 1, wherein the eyepiece comprises a concave lens, a first convex lens and a second convex lens, and the concave lens, the first convex lens and the second convex lens are sequentially disposed along the imaging optical path.

10. The display system according to claim 1, wherein the optical integrated rod is a taper cylinder.

11. The display system according to claim 1, wherein the solid-state light-emitting device comprises at least a light-emitting diode.

12. The display system according to claim 1, wherein the reflection mirror is formed on the second surface.

13. A head mounted display, comprising:
a frame;
a display system, comprising:
 an optical integrated rod;
 a solid-state light-emitting device disposed on an entrance of the optical integrated rod for emitting light to the optical integrated rod;
 a first total internal reflection prism having a first surface, a second surface and a third surface, wherein the first surface is disposed adjacent to an exit of the optical integrated rod;
 a reflection mirror disposed on the second surface;
 a second total internal reflection prism having a fourth surface, a fifth surface and a sixth surface, wherein the fourth surface is in contact with the third surface by an air gap;
 a digital micromirror device disposed adjacent to the fifth surface; and
 an eyepiece disposed adjacent to the sixth surface,
wherein the light is sequentially transmitted through the optical integrated rod, input from the first surface into the first total internal reflection prism, reflected by the third surface and the reflection mirror, and transmitted through the third surface, the fourth surface and the fifth surface so as to be input to the digital micromirror device along an illumination optical path, and then is sequentially reflected by the digital micromirror device, input from the fifth surface into the second total internal reflection prism, reflected by the fourth surface, and transmitted through the sixth surface and the eyepiece so as to be projected on a pupil surface along an imaging optical path; and
a waveguide component overlapped with the pupil surface for guiding the light, wherein the differences between incident angles of imaging light are between ±15°,
wherein the frame, the solid-state light-emitting device, the optical integrated rod, the first total internal reflection prism, the digital micromirror device, the second total internal reflection prism, the eyepiece and the waveguide component are sequentially disposed on a straight line.

14. The head mounted display according to claim 13, wherein the display system is integrally disposed inside the frame.

* * * * *